(12) United States Patent
Entin et al.

(10) Patent No.: US 9,189,648 B2
(45) Date of Patent: *Nov. 17, 2015

(54) DATA MAPPING USING TRUST SERVICES

(71) Applicant: MICROSOFT CORPORATION, Redmond, WA (US)

(72) Inventors: Michael Entin, Redmond, WA (US); Dmitry Denisov, Bellevue, WA (US); Lars Kuhtz, Seattle, WA (US); Irina Gorbach, Bellevue, WA (US); Venkatesh Krishnan, Sammamish, WA (US); Andrey Shur, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,081

(22) Filed: Aug. 13, 2014

(65) Prior Publication Data

US 2014/0351884 A1    Nov. 27, 2014

Related U.S. Application Data

(63) Continuation of application No. 13/644,921, filed on Oct. 4, 2012, now Pat. No. 8,819,770.

(51) Int. Cl.
*G06F 21/62* (2013.01)
*G06F 17/30* (2006.01)
*G06F 21/00* (2013.01)
*H04L 29/06* (2006.01)

(52) U.S. Cl.
CPC .......... *G06F 21/6227* (2013.01); *G06F 17/30* (2013.01); *G06F 17/30292* (2013.01); *G06F 21/00* (2013.01); *H04L 63/0428* (2013.01); *G06F 2221/2107* (2013.01)

(58) Field of Classification Search
CPC ............... G06F 17/30; G06F 21/6227; G06F 17/30292; G06F 21/00; G06F 2221/2107; H04L 63/0428
USPC ........................................................ 726/1
See application file for complete search history.

(56) References Cited

U.S. PATENT DOCUMENTS

| 2007/0050395 | A1* | 3/2007 | Hunter et al. | 707/102 |
| 2008/0288516 | A1* | 11/2008 | Hadfield | 707/100 |
| 2010/0161995 | A1* | 6/2010 | Browning | 713/189 |
| 2014/0101713 | A1 | 4/2014 | Entin | |

OTHER PUBLICATIONS

Notice of Allowance cited in U.S. Appl. No. 13/644,921 dated Apr. 25, 2014.

* cited by examiner

*Primary Examiner* — Kambiz Zand
*Assistant Examiner* — Aubrey Wyszynski
(74) *Attorney, Agent, or Firm* — Nicholas Chen; Sade Fashokun; Micky Minhas

(57) ABSTRACT

Embodiments are directed to mapping encryption policies to data stored in a database using a policy identifier, and to accessing data stored in a database using a policy identifier. In one scenario, a computer system receives an indication that identifies which type of encryption is to be applied when encrypting a specified portion of data stored in a database. The database has a database schema identified by a database schema identifier, where the database schema defines relationships for data stored in the database. The computer system then accesses a namespace that identifies a set of databases in which the specified portion of data is accessed in the same manner. The computer system also generates a policy identifier, which contains information including the namespace and the database schema identifier.

20 Claims, 4 Drawing Sheets

DATA MAPPING USING TRUST SERVICES

CROSS-REFERENCE TO RELATED APPLICATIONS

This application is a continuation of U.S. patent application Ser. No. 13/644,921 entitled "Data Mapping Using Trust Services", filed on Oct. 4, 2012, which application is incorporated by reference herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, web browsers allow users to access information such as web pages, email, videos, music and other types of data. In some cases, enterprises or other organizations may provide data on these web servers that is intended only for certain users (e.g. employees). In such cases, the employees typically log in and are authenticated before being given access to the data. In other scenarios, enterprises or other organizations may provide some or all of their data via a third party data host such as a cloud hosting company. Such cloud hosting companies may provide the organization's data and/or applications to a wide variety of authenticated and unauthenticated users.

BRIEF SUMMARY

Embodiments described herein are directed to mapping encryption policies to data stored in a database using a policy identifier. In one embodiment, a computer system receives an indication that identifies which type of encryption is to be applied when encrypting a specified portion of data stored in a database. The database has a database schema identified by a database schema identifier, where the database schema defines relationships for data stored in the database. The computer system then accesses a namespace that identifies a set of databases in which the specified portion of data is accessed in the same manner. The computer system also generates a policy identifier, which contains information including the namespace and the database schema identifier.

In another embodiment, a computer system accesses data stored in a database using a policy identifier. The computer system accesses a policy identifier that includes a database schema identifier that identifies a database schema associated with a database in which data is stored. The database schema defines relationships for data stored in the database, where a portion of data is encrypted using a type of encryption specified in an encryption policy. The policy identifier further includes a namespace identifier that identifies a set of databases in which the specified portion of data is accessed in the same manner. The computer system then uses the accessed policy identifier to access the encryption policy indicating the encryption type for the encrypted portion of data stored in the database and further uses the accessed policy identifier to access the encrypted portion of data according to the encryption type indicated in the encryption policy.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
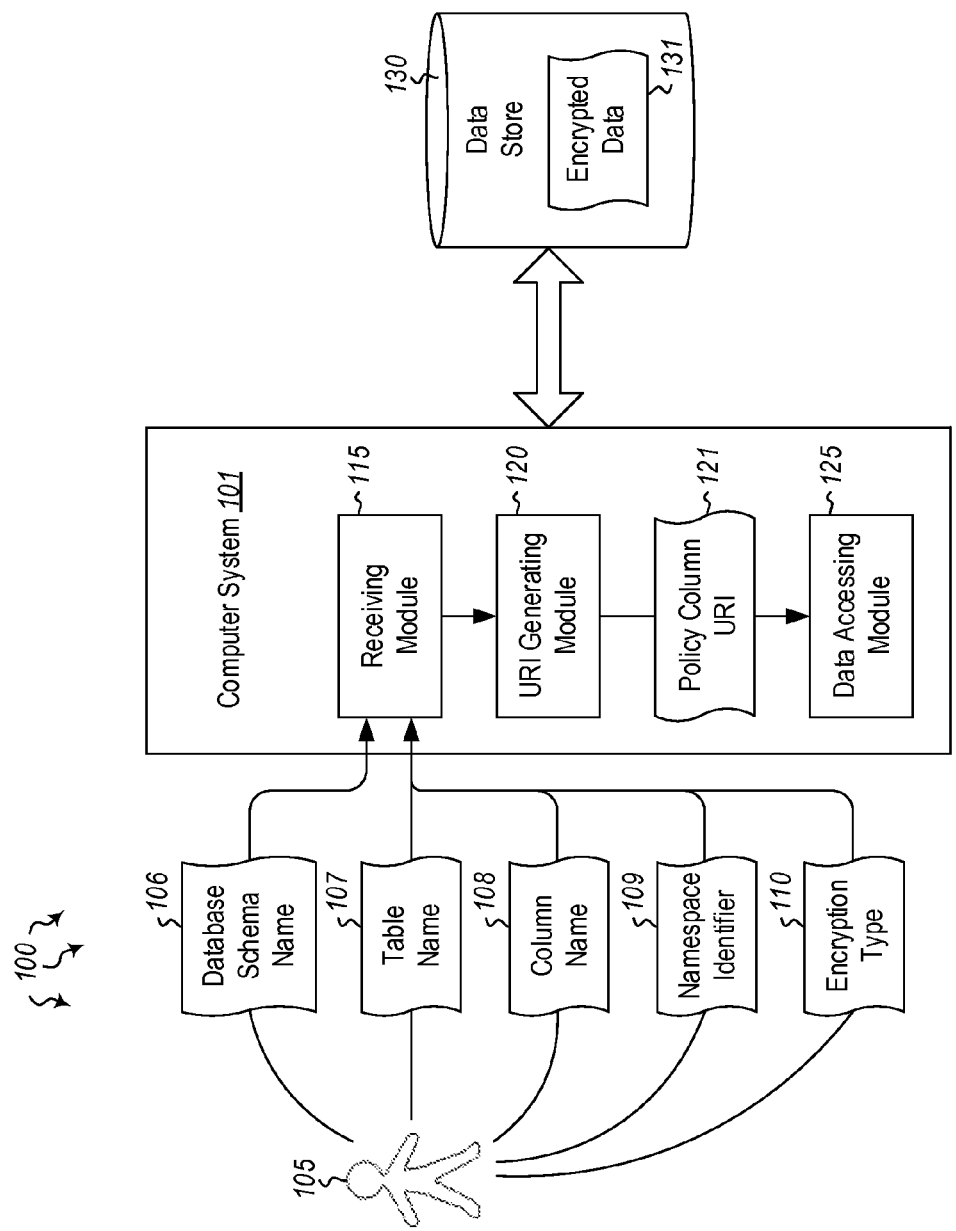
FIG. 1 illustrates a computer architecture in which embodiments described herein may operate including mapping encryption policies to user data stored in a database using a policy column uniform resource identifier (URI).

Embodiments described herein are directed to mapping encryption policies to user data stored in a database using a policy column uniform resource identifier (URI). In one embodiment, a computer system receives the following: a database schema name that identifies the name of a specified schema within a relational database in which at least some of a user's data is stored, a table name that identifies a specified table within the relational database, a column name that identifies a specified column in the specified table and a namespace identifier that identifies a set of relational databases where each column identified by the column name has the same semantics for each database in the set. The computer system also receives an indication that identifies which type of encryption is to be applied when encrypting the column of data specified by the column name. The computer system then generates a policy column URI that includes a hierarchical string comprising the namespace identifier, the database schema name, the table name and the column name.

In another embodiment similar to that above, a computer system receives the following: a database schema name that identifies the name of a specified schema within a relational database in which at least some of the user's data is stored, a table name that identifies a specified table within the relational database, a column name that identifies a specified column in the specified table and a namespace identifier that identifies a set of relational databases where each column identified by the column name has the same semantics for each database in the set. The computer system also receives an indication that identifies which type of encryption is to be applied when encrypting the column of data specified by the column name. The computer system then generates a policy column URI that includes a hierarchical string comprising the namespace identifier, the database schema name, the table name and the column name and further uses the generated policy column URI both to access an encryption policy indicating an encryption type for the encrypted data stored in the table identified by the table name and column identified by the column name, and to access the encrypted data according to the encryption type indicated in the encryption policy.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, receiving module 115 may receive various items from user 105 or from another computer system or software application. User 105 may be any type of computer user including end-user, administrator, IT specialist or other user such as a corporation or other business or governmental entity. The user may send, for example, database schema name 106, table name 107, column name 108, namespace identifier 109 and/or encryption type 110 to the receiving module 115 of computer system 101. These elements (106-109) may also be received from another computer system or software application, instead of being received from a user. These elements may be used by the URI (uniform resource identifier) generating module 120 to generate a policy column URI 121. The policy column URI may refer to a specific column, table or other namespace that is to be encrypted using the encryption type 110 specified by the user 105.

The format for the policy column URI 121, as well as its different uses, will be described in context with a trust services architecture. Trust services provide functionality to encrypt and decrypt table data that is stored in a user's database. Trust services store and maintain policies about user's data. The policies dictate encryption rules for the data columns in the user's database. To encrypt or decrypt the user's data, trust services map the policies to the user's data.

To map the policies to the data acquired from a relational database, the physical location of the data, as well as a description of the relational database may be stored on the computer system 101. However, locally storing such information may closely couple the trust services policies and physical location of the data, and may also rely on the database not being moved or renamed. Moreover, the physical location description may not be compact and may not be interoperable with different systems and protocols that use trust services. As such, the format of the policy column URI 121 is intended to be a simple, human readable, interoperable and compact format for referencing the data acquired from a relational database by policies stored in the trust services.

Embodiments described herein define a string format referred to as a policy column URI or simply "column URI" herein. The column URI is a part of a policy object in trust services. To map the database data to the policy, trust services creates a column URI and uses the column URI to find an appropriate policy.

The policy column URI 121 first includes a namespace identifier. The namespace identifier may be meaningful (to the user) or may be randomly generated for a database without the regard for database physical location or structure. A user application that uses trust services only needs to know the namespace identifier to allow trust services to find policies for the data acquired from the user's database. The database physical name and location do not need to be maintained by trust services. The namespace identifier may refer to a portion of data that is located and replicated in any number of physical databases.

The hierarchical structure of the column URI allows groups of related policies to be queried. A trust services application can retrieve from trust services all policies related to a specific database or table with a single request for the specified column URI. Examples of such queries might include: "db_column:Sales123/*" or "db_column:Sales123/Items/*". The hierarchical structure of the column URI also allows the creation of aliases for interoperability between systems. Trust services may acquire the data from the user's database directly or through another system. For example, trust services may need to decrypt data from a specified column: "dbo.Item.Column". Trust services may acquire the data from the database directly or indirectly through another service. If the data is acquired directly, trust services knows the column name "dbo.Item.Column", but if acquired from another protocol, trust services knows the entity and field name (e.g. "Protocol_Name.Items.Column". As such, trust services are able to maintain a single alias record (e.g. "protocol:ns1/Protocol_Name/Items→db_column:ns1/dbo/Item to construct the policy URIs and retrieve the following policies:

| | |
|---|---|
| Policy: db_column:ns1/dbo/Item/Column1 | clear text |
| Policy: db_column:ns1/dbo/Item/Column2 | encrypt and sign |

The hierarchical structure thus provides policy reuse and redefinition, configurable in central place and conciseness, allowing a single soft link at intermediate levels (e.g. for table, rather than for column, or even next level when table name does not change). The string based format also allows readability and interoperability between different systems that use trust services. Moreover, parsing and creation of URIs can be done using existing libraries in cases where the RFC2396 format is used to define the policy column URI format.

Embodiments described herein define a specific string format based on a uniform resource identifier (URI) format (e.g. RFC2396). The format is may be used for a policy column URI, which is an identifier for a policy object or for an application- or protocol-specific column URI, such as an OData column URI, which is an identifier for an alias record for a policy object.

As shown in FIG. 1, to create a new policy in trust services, a user (e.g. 105) provides a namespace identifier 109, a database schema name 106, a table name 107 and a column name 108 and constructs a policy column URI 121. Given the column name, and a set of encryption rules for this column (e.g. encryption type 110), user 105 can construct a policy for that column in trust services. For a set of policies for the same database, the user may choose the same policy namespace identifier. The policy namespace identifier can be meaningful, i.e. "Sales", or may be randomly chosen (e.g. a globally unique identifier (GUID)) to increase security.

For different applications, users can also create aliases for policies similar to soft links in a file system. Aliases are alternative URIs by which policies can be queried. Alias records map an application-specific column URI to a policy Column URI. To create such alias record, an application-specific column URI and a policy column URI are provided. To encrypt and decrypt user's data, a user application creates a policy column URI or an application-specific column URI. The user application maintains a namespace identifier in its own configuration or mapping information. The user application may obtain other parts of the column URI or an application-specific Column URI from metadata or header information. At least in some cases, each application constructs data URIs using its own private scheme, while the trust service will include data policies and "soft links" policies that allow interoperability between schemes.

When resolving the URI, trust services will find the longest matching policy. If trust services gets a data policy, it will use it. If it gets a "soft link" policy, it will read it, replace the matched URI part, and append the remaining parts and repeat.

For example, the following policies may be defined:

| | | |
|---|---|---|
| db_column:ns1/dbo/Item/Column1 | -> | clear text |
| db_column:ns1/dbo/Item/Column2 | -> | encrypt and sign |
| odata:ns1/ODataSvc/Items | -> | db_column:ns1/dbo/Item |

Applications that acquire the data from a database directly are able to create a column URI as it uses the "db_column:ns1/" scheme. Applications that acquire the data using OData protocol (or some other protocol) may attempt to resolve the URI "odata:n1/ODataSvc/Items/Column1" and may find only "odata:ns1/ODataSvc/Items". The application then reads the "soft link" policy, appends the remaining URI part (/Column1) and gets "db_column:ns1dbo/Item/Column1". In such cases, the application would resolve and the proper data would be found.

In one embodiment, the policy column URI follows this format:
db_column:namespace/db_schema_name/db_table_name/db_column_name
where "db_column" is the name of the URI scheme, specific for relational database column identification. "Namespace" identifies the set of relational databases where each column, identified by "db_schema_name/db_table_name/db_column_name", has the same semantics for each database in the set. The namespace may be specified by user 105. For increased security, randomly generated namespace strings are recommended. "db_schema_name" is the name of the database schema defined in the relational database, "db_table_name" is the name of the table defined in the relational database and "db_column_name" is the name of the column in the table defined in the relational database. At least in some cases, the same column in a relational database should not be referred by two 'db_column' URIs with different namespaces. The user 105 may be responsible for avoiding such column name collisions. Trust services may be used to define aliases and/or rename the column using the policy column URI. These and the other concepts mentioned above will be explained further below with regard to methods 200 and 300 of FIGS. 2 and 3, respectively.

Figure 2:
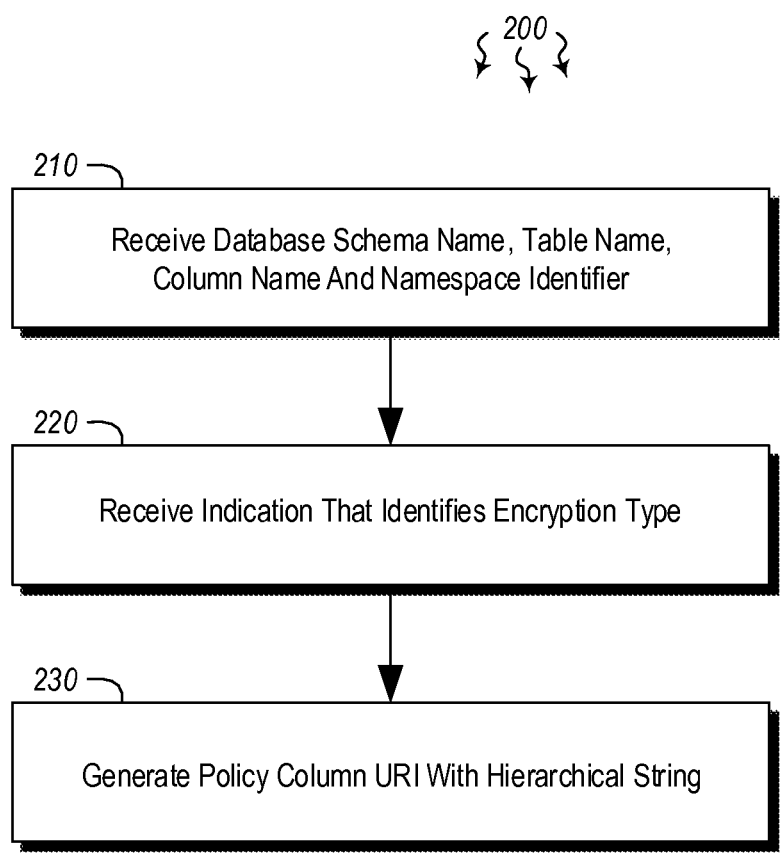
FIG. 2 illustrates a flowchart of an example method for mapping encryption policies to user data stored in a database using a policy column URI.
Figure 3:
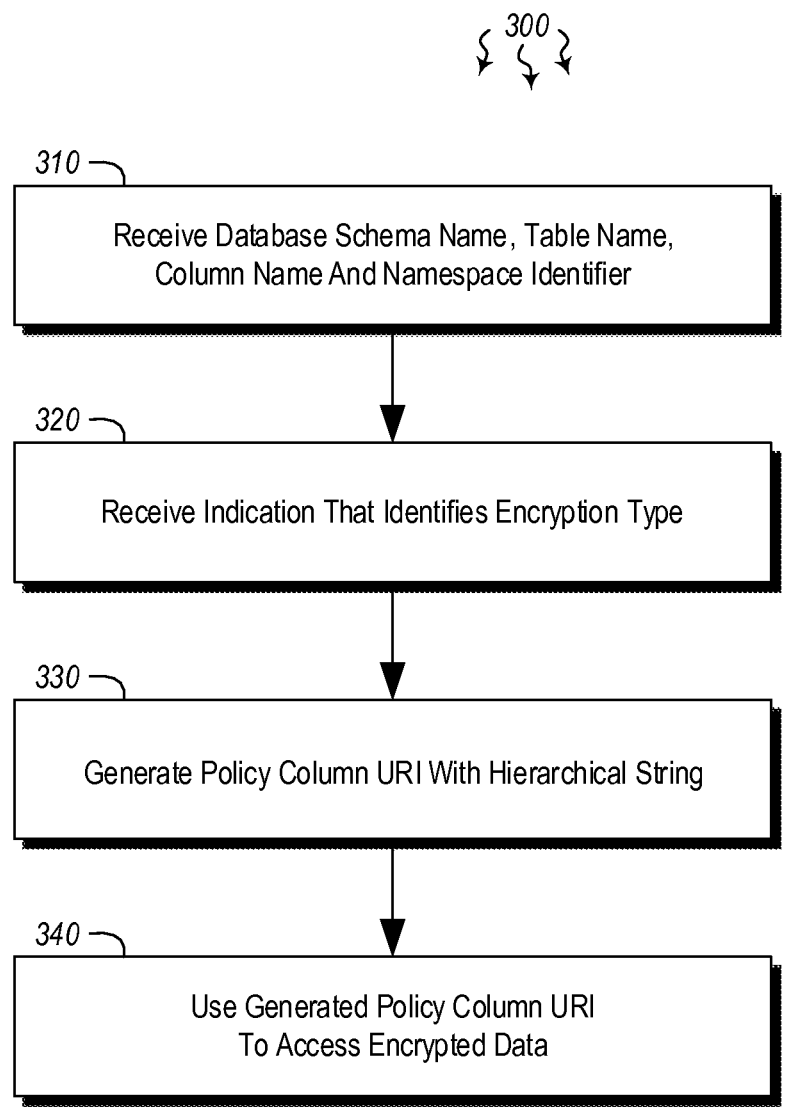
FIG. 3 illustrates a flowchart of an alternative example method for mapping encryption policies to user data stored in a database using a policy column URI.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for mapping encryption policies to user data stored in a database using a policy column uniform resource identifier (URI). The method 200 will now be described with frequent reference to the components and data of environment 100.

Method 200 includes an act of receiving the following from a user or from another computer system: a database schema name that identifies the name of a specified schema within a relational database in which at least a portion of the user's data is stored, a table name that identifies a specified table within the relational database, a column name that identifies a specified column in the specified table and a namespace identifier that identifies a set of relational databases where each column identified by the column name has the same semantics for each database in the set (act 210). For example, as shown in FIG. 1, user 105 may send a database schema name 106, table name 107, column name 108, namespace identifier 109 and encryption type 110. The user may be an administrator or other user. The database schema name 106 identifies a schema within the database in which the user's data is stored (e.g. data store 130). The table name 107 identifies a specified table within the database. The column name 108 identifies a specified column within the table specified by table name 107. The namespace identifier 109 identifies a set of multiple different relational databases where each column identified by column name 108 has the same URI semantics for each database in the set.

Figure 4:
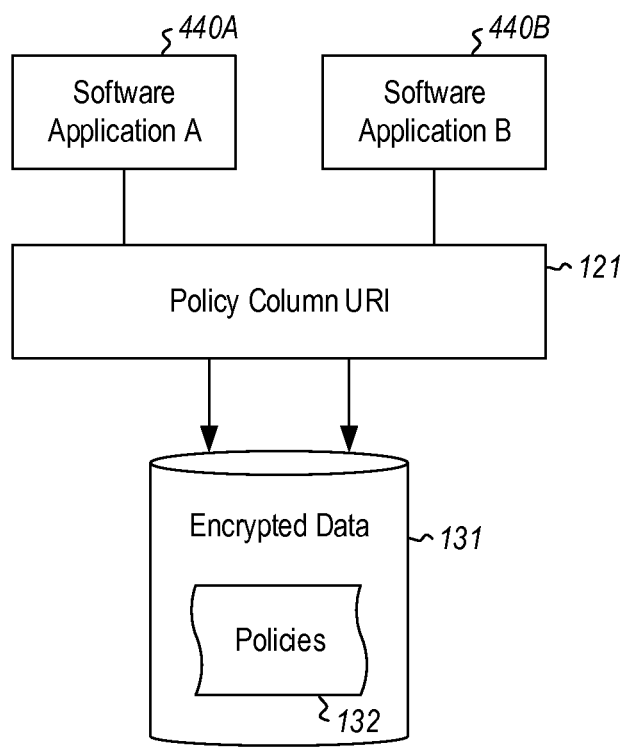
FIG. 4 illustrates an embodiment in which multiple applications access encrypted data using a policy column URI.

Method 200 next includes an act of receiving an indication from the user or other computer system that identifies which type of encryption is to be applied when encrypting the column of data specified by the column name (act 220). Thus, user 105 may send encryption type 110 which indicates the type of encryption that is to be used when encrypting the column of data specified by column name 108. This indication, along with the others (106-109) sent by the user 105, are received by receiving module 115 and used by URI generating module 120 to generate a policy column URI 121 (act 230). The policy column URI is a hierarchical string that includes the namespace identifier, the database schema name, the table name and the column name. Each element may be included as follows:
db_column:namespace/db_schema_name/db_table_name/db_column_name In some cases, the policy column URI 121 identifies multiple different columns that are to be encrypted using the type of encryption 110 indicated by the user 105. The policy column URI may also be used to retrieve various portions of data. The data may be identified by table, column, namespace and/or database name. The policy column URI may be shared between software applications to access encrypted data. For example, as shown in FIG. 4, software application A (440A) and software application B (440B) can both use policy column URI 121 to access encrypted data 131 and/or (encrypted) policies 132. In this manner, the policy column URI may be reused multiple times to access various portions of encrypted data. The policy column URI may be enforced by a client software application or other software application.

In addition, the policy column URI may be used to specify portions of a data blob that are to be encrypted. This may include columns, specific files or groups of files, or other portions of a data blob. The specified portions of the data blob may be encrypted automatically based on the policy column URI. Also, as indicated above, an alias may be created for a policy column URI (e.g. 121). The alias may be used to access the policy column URI. The alias may be any type of pointer, identifier or other type of alias that points to the policy column URI. The policy column URI may further be used to map encryption policies to user data stored in a database, as will be explained below with regard to FIG. 3.

FIG. 3 illustrates a flowchart of a method 300 for mapping encryption policies to user data stored in a database using a policy column uniform resource identifier (URI). The method 300 will now be described with frequent reference to the components and data of environment 100.

Method 300 includes an act of receiving the following from a user or from another computer system: a database schema name that identifies the name of a specified schema within a relational database in which at least a portion of the user's data is stored, a table name that identifies a specified table within the relational database, a column name that identifies a specified column in the specified table and a namespace identifier that identifies a set of relational databases where each column identified by the column name has the same semantics for each database in the set (act 310). The namespace identifier may have a specified meaning to the user (e.g. "Marketing") or it may be randomly generated. The namespace identifier may refer to the same data regardless of where the data is located and regardless of whether the data is replicated over multiple physical databases. The same namespace identifier may also apply to multiple different policies for the same database.

The receiving module 115 of computer system 101 then receives an indication from the user or from other computer system that identifies which type of encryption 110 is to be applied when encrypting the column of data specified by the column name (act 320). The URI generating module 120 generates a policy column URI that includes a hierarchical string comprising the namespace identifier 109, the database schema name 106, the table name 107 and the column name 108 (act 330). The data accessing module 125 then uses the generated policy column URI both to access an encryption policy indicating an encryption type for the encrypted data 131 stored in the table identified by the table name 107 and column identified by the column name 108, and to access the encrypted data according to the encryption type indicated in the encryption policy (act 340). As with the embodiments described above, an alias may be created for the policy column URI, which is an alternative URI by which the policy is queryable. Moreover, as described above, and as shown in FIG. 4, multiple applications (e.g. 440A and 440B) may use the generated policy column URI 121 to simultaneously access the same encrypted data stored in the table identified by the table name 107 and column identified by the column name 108 according to the encryption type indicated in the encryption policy.

Accordingly, methods, systems and computer program products are provided which map encryption policies to user data stored in a database using a policy column URI. The policy column URI is a hierarchical, human readable, interoperable and compact format for referencing data acquired from a relational database.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system, comprising:
 one or more processors; and
 one or more computer-readable storage media having stored thereon computer-executable instructions that are structured such that, when executed by the one or more processors, the computer-executable instructions configure the computer system to map encryption policies to data stored in a database using a policy identifier, including computer-executable instructions that configure the computer system to perform at least the following:
 receive an indication of a type of encryption that is to be applied when encrypting an identified column of data that is stored in a set of one or more databases, the one or more databases having a database schema that is identified by a database schema identifier, the database schema defining one or more relationships for data that is stored in the set of one or more databases;
 identify a namespace of the set of one or more databases, in which the identified column of data is accessed in the same manner in each of the one or more databases; and
 generate a policy identifier that identifies an encryption policy including the identified type of encryption, the policy identifier comprising a hierarchical string identifying the namespace, the database schema identifier, and the identified column.

2. The computer system of claim 1, wherein the policy identifier identifies a plurality of different columns that are to be encrypted using the indicated type of encryption.

3. The computer system of claim 1, wherein the policy identifier identifies a plurality of different rows that are to be encrypted using the indicated type of encryption.

4. The computer system of claim 1, also including computer-executable instructions that configure the computer system to use the policy identifier to retrieve one or more portions of data.

5. The computer system of claim 1, wherein the policy identifier is shared between one or more software applications to access encrypted data.

6. The computer system of claim 1, also including computer-executable instructions that configure the computer system to receive a table name that identifies at least one specified table within the set of one or more databases.

7. The computer system of claim 6, wherein the hierarchical string also identifies the at least one specified table.

8. The computer system of claim 1, wherein the policy identifier is used to specify one or more portions of a data blob that are to be encrypted.

9. The computer system of claim 8, wherein the specified portions of the data blob are encrypted automatically based on the policy identifier.

10. The computer system of claim 1, also including computer-executable instructions that configure the computer system to:
 create an alias for the policy identifier, the alias including a user-readable reference to the policy identifier; and
 access the policy identifier using the alias.

11. A method, implemented at a computer system that includes one or more processors, for accessing data stored in a database using a policy identifier, the method comprising:

accessing a policy identifier that identifies an encryption policy including an identified encryption type, the policy identifier comprising a hierarchical string identifying:
- an identified column of data that is stored in a set of one or more databases and that is encrypted with the identified encryption type;
- a database schema identifier that identifies a database schema associated with the set of one or more databases, the database schema defining one or more relationships for data that is stored in the set of one or more databases; and
- a namespace identifier of a namespace of the set of databases, in which the identified column of data is accessed in the same manner in each of the one or more databases;

using the accessed policy identifier to access the encryption policy identifying the encryption type for the identified column of data; and using the accessed policy identifier to access the encrypted column of data according to the encryption type indicated in the encryption policy.

12. The method of claim 11, further comprising receiving a table name that identifies a specified table within the set of one or more databases.

13. The method of claim 12, wherein the hierarchical string also identifies the at least one specified table.

14. The method of claim 11, wherein the namespace identifier refers to the same data regardless of where the data is located and regardless of whether the data is replicated over multiple physical databases.

15. The method of claim 11, wherein the same namespace identifier applies to a plurality of different policies for the same database.

16. The method of claim 11, further comprising creating an alias for the policy identifier, wherein the alias comprises an alternative identifier by which the policy is queryable.

17. A method, implemented at a computer system that includes one or more processors, for mapping encryption policies to user data stored in a database using a policy identifier, the method comprising:
- receiving an indication of a type of encryption that is to be applied when encrypting an identified column of data that is stored in a set of one or more databases, the one or more databases having a database schema that is identified by a database schema identifier, the database schema defining one or more relationships for data that is stored in the set of one or more databases;
- identifying a namespace of the set of one or more databases, in which the identified column of data is accessed in the same manner in each of the one or more databases; and
- generating a policy identifier that identifies an encryption policy including the identified type of encryption, the policy identifier comprising a hierarchical string identifying the namespace, the database schema identifier, and the identified column.

18. The method of claim 17, further comprising receiving a table name that identifies at least one specified table within the set of one or more databases.

19. The method of claim 18, wherein the hierarchical string also identifies the at least one specified table.

20. The method of claim 17, further comprising:
- creating an alias for the policy identifier, the alias including a user-readable reference to the policy identifier; and
- accessing the policy identifier using the alias.

* * * * *